United States Patent Office 3,499,942
Patented Mar. 10, 1970

3,499,942
METHOD OF PREPARING FLUOROAROMATIC COMPOUNDS
Oleg Matveevich Nefedov, Ulitsa Shukhova, 5/7, kv. 15, and Anna Akimovna Ivashenko, Belyaevo-Bogorodskoe, kvartal 46, korp. 43, kv. 77, both of Moscow, U.S.S.R.
No Drawing. Filed May 26, 1967, Ser. No. 641,501
Claims priority, application U.S.S.R., June 11, 1966, 1,083,107; Aug 1, 1966, 1,096,749
Int. Cl. C07c 25/04
U.S. Cl. 260—649                                    1 Claim

ABSTRACT OF THE DISCLOSURE

Carbocyclic mono- and di-fluorinated aromatic compounds are prepared by pyrolyzing, at 300°–800° C. a mixture of a conjugated diene and a fluorine containing polyhalide.

---

The present invention relates to methods of preparing fluoroaromatic compounds and, more particularly, to a method of preparing carbocyclic mono- and difluoroaromatic compounds.

These fluoroaromatic compounds can be used as starting materials for the production of fluorine-containing monomers, biologically active substances (including pharmaceuticals) and dyes.

A method is known for preparing mono-, di- and polyfluoroaromatic compounds, e.g. fluorobenzenes, by consecutively or simultaneously replacing the amino groups with fluorine in aromatic various amines by diazotization, preferably by the Schiemann method (M. Gudlitsky, Khimia organicheskikh soyedinenii ftora, Goskhimizdat, Moscow, 1961, pp. 100–105; G. Balz & G. Schiemann, Berichete Deutsch. Chem. Ges. 60, 1186 (1927); G. C. Finger & R. E. Oesterling, J. Am. Chem. Soc., 78, 2593 (1956); E. D. Bergmann, S. Berkovic & R. Ikan, J. Am. Chem. Soc., 78, 6037 (1956). According to this method, the initial aromatic amine or diamine is diazotized by conventional means with the subsequent conversion of the aryldiazonium halide (usually the chloride) formed in the first stage into its corresponding borofluoride, which is then subjected to thermal or thermocatalytic decomposition. The performance of this process requires an excess of reagents, particularly the hydrofluoric acid, and the use of apparatus of large capacity, as well as special apparatus; the process is sensitive to temperature changes and consists of 3 or 4 stages and a number of separate operations, such as mixing, cooling, filtering, washing, drying and heating.

Methods are also known for the direct fluorination of the aromatic ring, e.g. benzene, by means of chlorine trifluoride (J. F. Ellis & W. R. Musgrave, J. Chem. Soc., 1950, 3608; 1953, 1063) and substitution of fluoride for chlorine in mono- and dichlorobenzenes under the action of potassium fluoride at 400–450° C. (G. G. Yakobson, V. E. Platonov, V. S. Kryukova, N. A. Gershtein & N. N. Vorozhtsov, Zhurnal obshchei Khinaii, 36, 2131 (1966) However, the yield of the end products in these cases is only 7–25%.

It is an object of the present invention to provide a method for preparing these fluoroaromatic compounds which is free from the disadvantages of the known methods.

This object has been achieved in the present invention by the provision of a method for preparing carbocyclic mono- and di-fluoroaromatic compounds wherein aliphatic compounds containing one or more fluorine atoms are subjected to pyrolysis along with a compound having a conjugated system of double bonds at a temperature of 300–800° C.

The following compounds may be used as the conjugated compound: cyclic dienes, e.g. cyclopentadiene and its dimer; alkylcyclopentadienes, e.g. methylcyclopentadiene, and their dimers; arylcyclopentadienes, e.g. phenylcyclopentadiene, and their dimers; halo cyclopentadienes, e.g. hexachlorocyclopentadiene; indene and alkyl- and aryl-substituted indenes, e.g. methylindenes and phenylindenes; acyclic 1,3-dienes, e.g. butadiene, isoprene and piperylene.

The following compounds may be used as the fluorine-containing at least component: fluorohalo methanes containing one fluorine atom out of a total of not less than three halogen atoms, e.g. $CHF_2Cl$, $CF_2Cl_2$, $CF_2Br_2$, $CHCl_2F$, $CHF_3$ and $CF_3I$; tetrahalo ethylenes containing two or more atoms of fluorine, e.g. tetrafluoroethylene, trifluorochloroethylene and 1,1-difluoro-2,2-dichloroethylene; perfluorocycloalkanes, e.g. octafluorocyclobutane.

The process is performed by passing a mixture of the fluorine-containing compound and the conjugated compound through a heated tube at a temperature within the range of 300 to 800° C. and a pressure up to 10 atm., preferably at atmospheric pressure. The initial mixture may be diluted with a gas, e.g. nitrogen, or other substance, e.g. water vapor or ammonia.

Under the above conditions, cyclopentadiene and its dimers are converted into fluorobenzene with a yield up to 80–90%; substituted cyclopentadienes—are converted into the corresponding substituted fluorobenzenes with yields up to 60–70%; indene is converted into 2-fluoronaphthalene with a yield up to 60–70%; substituted indenes are converted into the corresponding substituted 2-fluoronaphthalenes with yields up to 50–60%; butadiene are converted into a mixture of isomeric difluorobenzenes with a total yield up to 50%; piperylene and isoprene are converted into a mixture of isomeric difluorotoluenes with total yields up to 40%; other substituted 1,3-butadienes are converted into a mixture of isomers of the corresponding substituted difluorobenzenes with total yields up to 30–40%.

The fluoroaromatic compounds thus formed are isolated from the pyrolysis products by simple distillation.

EXAMPLE 1

Through an empty quartz tube 25 cm. long and 2 cm. in diameter placed in a heated tube, there are passed 12 g. (0.182 mol) of freshly distilled cyclopentadiene in a stream of $CHF_2Cl$ at the rate of 22–23 liters/hour for a period of 20 min. at 600° C. and atmospheric pressure. The pyrolysis products are collected in a condenser device consisting of a funnel and a water-cooled reflux condenser and two consecutively connected traps cooled with a mixture of acetone and solid carbon dioxide, washed with water to a neutral pH and dried over $CaCl_2$. Fractionation in a column gives 11.6 g. of fluorobenzene in a yield of 67% based on the initial cyclopentadiene; B.P. 85–85.5°/751 mm.; $n_D^{20}$ 1.4670; $d_4^{20}$ 1.0087.

*Analysis.*—Calc'd for $C_6H_5F$ (percent): C, 75.05; H, 5.24; F, 19.71. Found (percent): C, 75.70, 75.90; H, 4.87, 5.02; F, 19.25, 19.50.

The purity and yield of the fluorobenzene were checked by means of gas-liquid chromatography (column 100 x 0.4 cm.; 15% "Tween-40" on chromosorb; temperature 55° C.; carrier gas, helium; rate 7.5 liters/hour).

EXAMPLE 2

In a manner similar to that of Example 1, there are obtained from 12 g. (0.182 mol) of cyclopentadiene in a stream of $CHF_2Cl$ (at the rate of 22–23 liters/hour over a period of 15 min. (pyrolysis time) at a temperature of 650° C., 8 g. of fluorobenzene, a yield of 46% based on the initial diene.

EXAMPLE 3

Example 1 repeated at a pyrolysis temperature of 700° C. Yield of fluorobenzene 52%.

EXAMPLE 4

In the apparatus described in Example 1 there are obtained from 11.4 g. (0.142 mol) of methylcyclopentadiene in the stream of $CHF_2Cl$ at a rate of 22–23 liters/hour over a period of 45 min. at 600° C. and atmospheric pressure, 7.3 g. of fluorotoluene (apparently a mixture of isomers); yield 47% based on the initial diene; B.P. 115–116°/737 m.; $n_D^{20}$ 1.4712.

EXAMPLE 5

In the apparatus and under the conditions of Example 1 there are obtained from $CHF_2Cl$ and 16.52 g. (0.125 mol) of the crude dimer of cyclopentadiene over a period of 25 min., 17.4 g. of fluorobenzene, i.e. a yield of 70% based on the initial dimer and 59% based on the unreacted $CHF_2Cl$.

EXAMPLE 6

From 7.2 g. (0.045 mol) of the dimer of methylcyclopentadiene in a stream of $CHF_2Cl$ at the rate of 22–23 liters/hour under the conditions of Example 1 there are obtained in 20 min. 6.1 g. of fluorotoluenes, i.e. a yield of 61% basis on the initial dimer.

EXAMPLE 7

The pyrolysis of a mixture of 58.1 g. (0.5 mol) of indene and 1.5 mols of $CHF_2Cl$ is carried out in the apparatus described in Example 1 at a flow rate of 22–23 liters/hour, temperature of 600° C. and pressure of 760 m. In 1.5 hr. 37.1 g. of of β-fluoronaphthalene are obtained; yield 51% based on the initial indene; B.P. 59–60° C./5 mm.; M.P. 60–61° C.

*Analysis.*—Calc'd for $C_{10}H_7F$ (percent): C, 82.17; H, 4.83; F, 12.99. Found (percent): C, 82.00, 81.70; H, 4.85, 4.82; F, 12.98, 13.30.

EXAMPLE 8

A mixture of 23.9 g. (0.125 mol) of $CF_2Br_2$ and 33.1 g. (0.5 mol) of cyclopentadiene is passed through a quartz tube at a temperature of 400–420° C. and atmospheric pressure over a period of 45 min. From the pyrolysis products there are isolated 3.6 g. of fluorobenzene, i.e. a yield of 30% based on the initial $CF_2Br_2$.

EXAMPLE 9

Similar to Example 8 with the exception that pyrolysis is carried out at 300–350° C. Yield of fluorobenzene 15–20%.

EXAMPLE 10

Similar to Example 1 with the exception that pyrolysis is carried out in a steel tube of the same dimensions. Yield of fluorobenzene 65%.

EXAMPLE 11

Similar to Example 1 with the exception that the initial mixture of cyclopentadiene and $CHF_2Cl$ is diluted with nitrogen (passage rate 10 liters/hour). Yield of fluorobenzene 60%.

EXAMPLE 12

Similar to Example 1 with the exception that pyrolysis is carried out under diminished pressure (100–150 mm. Hg), and the passage rate is reduced to one-half. Yield of fluorobenzene 50%.

EXAMPLE 13

Similar to Example 1 with the exception that pyrolysis is carried out in the presence of $NH_3$ (passage rate 10–20 liters/hour). Yield of fluorobenzene 73%.

EXAMPLE 14

From 12 g. (0.182 mol) of cyclopentadiene and $CHFCl_2$ at a passage rate of 20 liters/hour under the conditions of Example 1, there are obtained 11.2 g. of fluorobenzene, i.e. a yield of 65%.

EXAMPLE 15

Similar to Example 1 with the exception that $CF_2Cl_2$ is used as the fluorine-containing polyhalide and pyrolysis is carried out at a temperature of 700–750° C. Yield of fluorobenzene 53%.

EXAMPLE 16

Similar to Example 1 with the execption that $CHF_3$ is used as the fluorine-containing polyhalide and pyrolysis is carried out at 750–800° C. Yield of fluorobenzene 44%.

EXAMPLE 17

Similar to Example 1 with the exception that phenylcyclopentadiene is used instead of cyclopentadiene. A mixture of isomeric fluorobiphenyls is obtained in a yield of 42%.

EXAMPLE 18

Similar to Example 1 with the exception that hexachlorocyclopentadiene is used as the compound having a conjugated system of double bonds. A mixture of polychlorides is obtained which contains aproximately 20% pentachlorofluorobenzene according to gas-liquid chromatography.

EXAMPLE 19

Through an empty quartz tube of 25 x 2 cm. placed in a heated tube is passed a mixture of butadiene and $CHF_2Cl$ at rates of 10 liters/hour and 20 liters/hour, respectively (molar ratio $C_4H_6$: $CHF_2Cl=1:2$), at a temperature of 650° C. and pressure of 740 mm. In 40 min. there are collected in the condenser device (funnel with water-cooled reflux condenser, and two consecutively connected traps cooled with acetone-solid carbon dioxide mixture) 17.2 g. of pyrolysis products, which are washed with water to a neutral pH and dried over $CaCl_2$. Fractionation in a column gives 15.5 g. of a mixture of isomeric difluorobenzenes: yield 48% based on the initial diene; B.P. 80–86° C./739 mm.; $n_D^{20}$ 1.4376; $d_4^{20}$ 1.1571.

*Analysis.*—Calc'd for $C_6H_4F_2$ (percent): C, 63.16; H, 3.54; F, 33.30. Found (percent): C, 62.50, 61.50; H, 3.69, 3.62; F, 33.10, 33.34.

According to gas-liquid chromatography (column 200 x 0.4 cm.; 15% "Tween-40" on chromosorb W; temperature 67° C.; carrier gas, helium; passage rate 7.5 liters/hour), the isolated mixture contains three peaks, two of which coincide with reference specimens of p- and m-difluorobenzene.

The infrared spectrum of the mixture of difluorobenzene isomers fully coincides with the spectra of the reference specimens. The infrared spectrum contains bands of an aromatic ring: 3,085, 1,605 and 1,500 cm.$^{-1}$; bands characteristic of O-difluorobenzene: 455, 750 and 930 cm.$^{-1}$; characteristic of m-difluorobenzene: 455, 675, 770, 860 and 950 cm.$^{-1}$; characteristic of p-difluorobenzene: 510, 840, 1,140, 1,010 and 1,085 cm.$^{-1}$. In the 1,100–1,300 cm.$^{-1}$ region there is a series of strong bands characteristic of C—F bond: 1,180, 1,210 and 1,275 cm.$^{-1}$.

The nuclear-magnetic resonance spectrum of the isolated mixture of isomeric difluorobenzenes has signals with τ6.75, 6.85 and 6.95 millionths, which fully coincides with the signals of the nuclear-magnetic resonance spectrum of the reference specimen of isomeric difluorobenzenes.

EXAMPLE 20

The pyrolysis of 58 g. (0.855 mol) of piperylene and ~2 mols of $CHF_2Cl$ is carried out in the apparatus described in Example 19 at a passage rate of $CHF_2Cl$ of 46 liters/hour over a period of 1 hr. at a temperature of 580–600° C. After the usual treatment of the pyrolysis products there are isolated by fractionation in a column, 32.8 g. of a fraction having B.P. 90–110° C./746 mm., $n_D^{20}$ 1.4485 and 1.1376, which comprises a mixture of isomeric difluorotoluenes; yield 30% based on the initial diene.

*Analysis.*—Calc'd for $C_7H_6F_2$ (percent): C, 65.62; H, 4.72; F, 29.66. Found (percent): C, 65.67, 65.70; H, 5.14, 4.83; F, 28.90, 28.90.

The yield and purity of isomeric difluorotoluenes are checked by gas-liquid chromatography (conditions as in Example 19).

The infrared spectrum of the isolated mixture of isomeric difluorotoluenes contains bands of an aromatic ring in the region of 700–900 cm.$^{-1}$, 1,500, 1,520, 1,598, 3,060 and 3,090 cm.$^{-1}$ and a series of bands characteristic of the C—F bond (1,200, 1,210 and 1,290 cm.$^{-1}$).

EXAMPLE 21

The pyrolysis of 20 g. (0.294 mol) of isoprene and 0.67 mol of $CHF_2Cl$ is carried out in the apparatus and under the conditions described in Examples 19 and 20 (temperature 600° C., pressure 746 mm. and passage rate 30 liters/hour). In 30 min. there are obtained 14.8 g. of pyrolysis products, from which, after the usual treatment, there are isolated by fractionation in a column 8.5 g. of a fraction having B.P. 113.5–114° C./751 mm., $n_D^{20}$ 1.4508 and $d_4^{20}$ 1.0252. According to elemental and chromatographic analysis under the conditions of Example 19, the isolated fraction contains 70% of a mixture of isomeric difluorotoluenes. Yield of isomeric difluorotoluenes 22.5% based on the initial diene.

The infrared spectrum of the isolated fraction fully coincides with that of the mixture of isomeric difluorotoluenes obained by the pyrolysis of a mixture of $CHF_2Cl$ and piperylene (Example 20).

EXAMPLE 22

Through an empty quartz tube 25 cm. long and 2 cm. in diameter placed in a heated tube and fitted with a condenser device are passed at a temperature of 600° C. and atmospheric pressure 5 g. (0.038 mol) of the dimer of 1,3-cyclopentadiene in a stream of tetrafluoroethylene at a rate of 23 liter/hour over a period of 10 min. In the condenser device there are collected 7 g. of liquid pyrolysis products which, according to gas-liquid chromatography (column 200 x 0.4 cm., 15% "Tween-40" on chromosorb W, temperature 73° C., passage rate of helium carrier gas 7.5 liter/hour), contains 78.5% (5.5 g.) of fluorobenzene. Thus, the yield of fluorobenzene, identical with the reference specimen, is 66.5% based on the initial dimer.

EXAMPLE 23

Similar to Example 22 with the exception that trifluorochloroethylene is used instead of tetrafluoroethylene. Yield of fluorobenzene 62%.

EXAMPLE 24

Similar to Example 22 with the exception that perfluorocyclobutane is used as the fluorine-containing component. Yield of fluorobenzene 52%.

EXAMPLE 25

A mixture of divinyl and tetrafluoroethylene is subjected to pyrolysis in the apparatus described in Example 22, the passage rate of the gases being 10 and 15 liters/hour, respectively, at a temperature of 600° C. and pressure of 740 mm. over a period of 30 min. Consumption of gases during this period is 0.22 mol of butadiene and 0.33 mol of tetrafluoriethylene. From the pyrolysis products after the usual treatment there are isolated by distillation in a column, 9 g. of a mixture of isomeric difluorobenzenes; yield 36% of theory; B.P. 85–93° C.; $n_D^{20}$ 1.4380. The purity and yield of isomeric difluorobenzenes are checked chromatographically (conditions as in Example 22), making use of a mixture of known difluorobenzenes.

What we claim is:

1. A method of preparing mono- and difluorinated aromatic carbocyclic compounds, said method comprising pyrolyzing at a temperature of 300°–800° C. a mixture of
    (a) a cyclic 1,3-diene which is cyclopentadiene, an alkylcyclopentadiene, an arylcyclopentadiene, a halocyclopentadiene, a dimer thereof, indene, an alkyl substituted indene or an aryl substituted indene; or
    (b) an acyclic 1,3-diene which is butadiene, isoprene or piperylene, together with a fluorohalomethane, a tetrahaloethylene having at least two fluorine atoms or a perfluorocycloalkane.

References Cited

UNITED STATES PATENTS 3,004,077  10/1961  Banks et al.

DANIEL D. HORWITZ, Primary Examiner

U.S. Cl. X.R.

260—650